(12) United States Patent
Rhoades

(10) Patent No.: US 6,419,749 B1
(45) Date of Patent: Jul. 16, 2002

(54) APPARATUS FOR UV CURING A COATING ON A FILAMENT OR THE LIKE AND METHOD OF MANUFACTURING

(75) Inventor: Robert L. Rhoades, Ijamsville, MD (US)

(73) Assignee: Fusion UV Systems, Inc., Gaithersburg, MD (US)

( * ) Notice: Subject to any disclaimer, the term of this patent is extended or adjusted under 35 U.S.C. 154(b) by 0 days.

(21) Appl. No.: 09/434,291

(22) Filed: Nov. 5, 1999

(51) Int. Cl.$^7$ ................................................ B05B 5/00
(52) U.S. Cl. ........................................ 118/641; 118/620
(58) Field of Search ..................... 250/492.1, 504.2; 118/641, 620, 642; 65/432

(56) References Cited

U.S. PATENT DOCUMENTS

| | | | |
|---|---|---|---|
| 3,686,940 A | | 8/1972 | Kockott |
| 3,807,052 A | | 4/1974 | Troue |
| 4,636,405 A | * | 1/1987 | Mensah et al. ............ 427/54.1 |
| 4,644,899 A | | 2/1987 | Glaus |
| 4,710,638 A | * | 12/1987 | Wood ...................... 250/492.1 |
| 4,864,145 A | | 9/1989 | Burgio, Jr. |
| 4,880,988 A | | 11/1989 | Witt |
| 4,990,789 A | | 2/1991 | Uesaki |
| 5,092,264 A | | 3/1992 | Overton et al. |
| 5,623,149 A | * | 4/1997 | Kilmer .................... 250/504 R |
| 5,691,838 A | | 11/1997 | Shouji et al. |
| 5,715,173 A | * | 2/1998 | Nakajma et al. ............ 364/500 |
| 5,992,181 A | * | 11/1999 | Geertman ................ 250/492.1 |

* cited by examiner

*Primary Examiner*—Brenda A. Lamb
(74) *Attorney, Agent, or Firm*—Shlesinger, Arkwright & Garvey LLP

(57) ABSTRACT

This invention relates to a tubular apparatus for UV curing coatings on a continuous filament in which concentric tubes are provided and through which the filament passes after being coated for curing the coating, with the apparatus having the first inner tube which passes the UV light through the tube to cure the filament passing therethrough, and a second concentric tube superposed over the first tube and spaced therefrom which reflects IR light and passes UV light to prevent burning and destroying the coating on the filament as it passes through the first tube.

14 Claims, 2 Drawing Sheets

APPARATUS FOR UV CURING A COATING ON A FILAMENT OR THE LIKE AND METHOD OF MANUFACTURING

FIELD OF THE INVENTION

This invention relates to apparatus for curing ultraviolet (UV) coatings on filaments and the like which prevents the infrared (IR) radiation from overheating the UV curable coating and destroying the same by reflecting the infrared light and passing the ultraviolet light. This is done by providing a concentric tube about the main tube which reflects the IR light and permits the UV light to pass through to the outer tube and through the inner tube to the filament to cure the resin.

HISTORICAL BACKGROUND OF THE INVENTION

For purposes of understanding the background of the invention, reference is made to U.S. Pat. No. 4,710,638 issued Dec. 1, 1987, which is hereby incorporated by reference. This reference shows a prior art radiation lamp and reflectors for directing the radiation on a coated filament.

Optical fibers are very delicate and can be strengthened by applying and curing secondary and tertiary coatings. The fibers are coated with a UV curable resin and an UV irradiator cures the resins. Available UV irradiators generate a large amount of energy, typically 3000–6000 watts of energy, some of which is in the infrared range, which can be damaging to the coating. There is, therefore, a need for an irradiator that minimizes the amount of IR radiation that reaches the UV curable coating.

Overton, U.S. Pat. No. 5,092,264, shows a method of controlling the temperature at which the coating on an optical fiber is cured. Overton controls the control the temperature to obtain a coating material with predetermined moduli by means of IR absorbing gas which is moved between two concentric tubes.

OBJECTS AND SUMMARY OF THE INVENTION

It is an object of this invention to provide a simple and non-expensive method of controlling the IR radiation generated by a UV curing apparatus to avoid overheating of the coating of an optical filament or the like.

It is another object of this invention to provide a tubular apparatus having inner and outer tubes that permits the innertube to be removed for replacement or cleaning, if desired, due to the resin residue which builds up on the inside of the innertube over time, degrading its ability to transmit the UV radiation. This can be done without removal of the outertube which has a means for controlling the IR radiation.

It still another object of this invention is to provide a simple mirror reflective means which is an over jacket for the main tube through which the filament passes and which will transmits UV energy while minimizing the IR energy.

It is a further object of this invention is to provide a means for maintaining the mirrored tube in good condition without having to remove it frequently as it is necessary with the inner processing tube.

These and other objects of this invention will be apparent from the following description and drawings.

In summary, this invention provides a system for controlling the IR radiation while permitting transmittal of the UV radiation and which allows ready cleaning of the innertube without damage to the outertube.

DESCRIPTION OF THE DRAWINGS

FIGS. 1, 2, 3 AND 4

Figure 1:
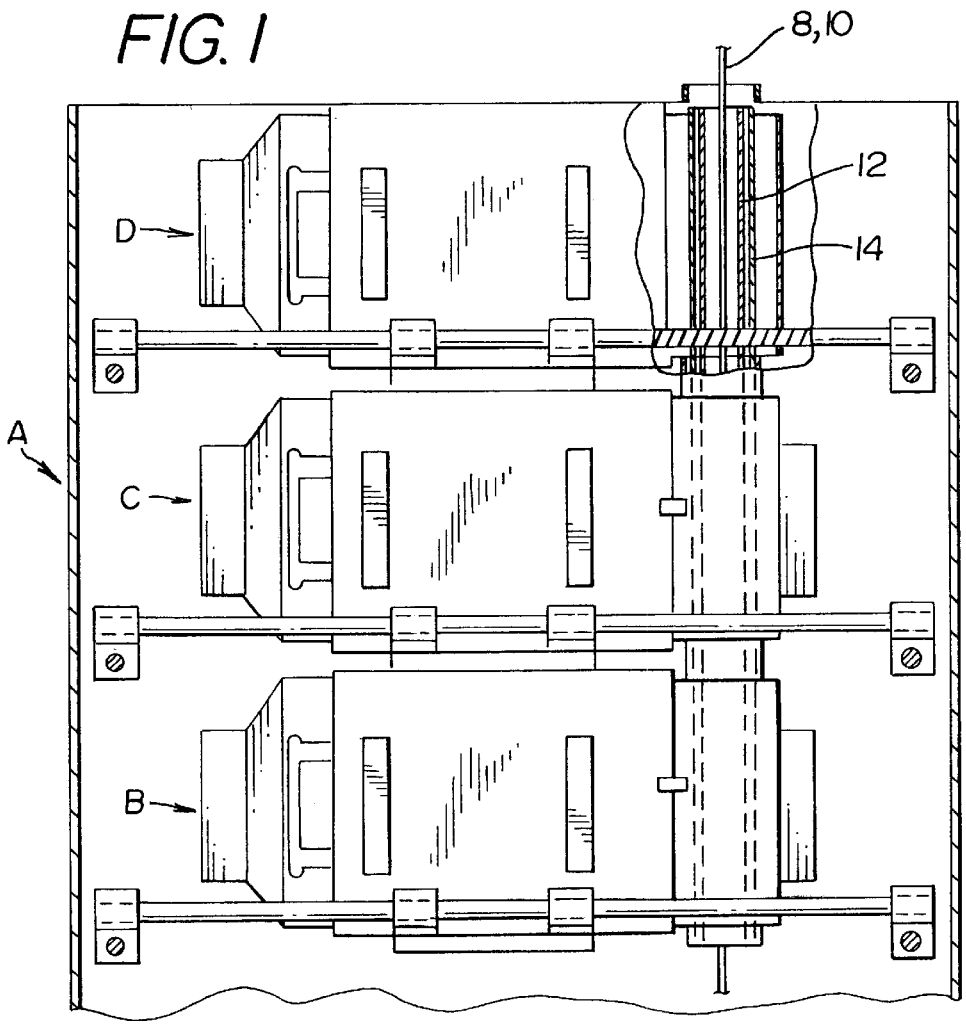
FIG. 1 is a fragmentary view portions of which are broken away and shown in cross-section showing an array of three of the irradiating units made in accordance with the present invention.
Figure 2:
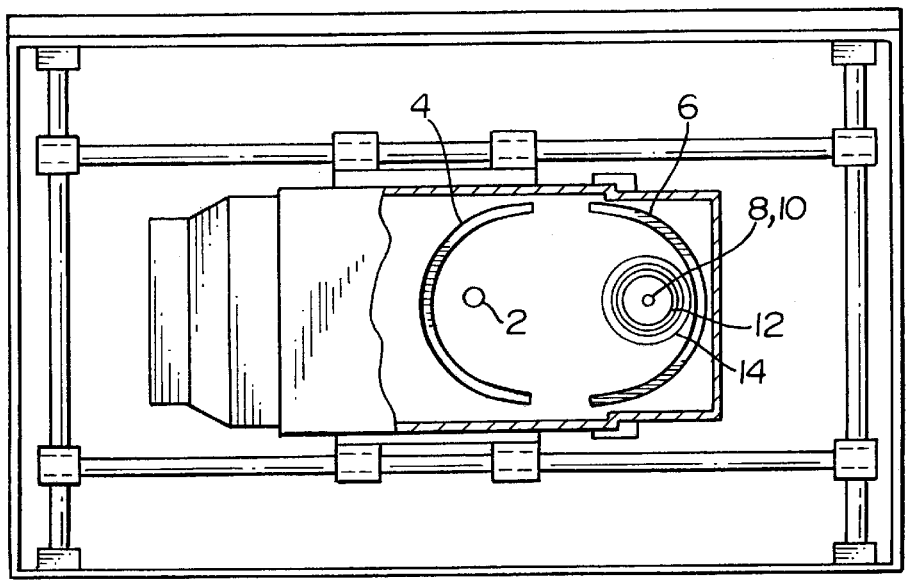
FIG. 2 is an end view broken away to show the light transmitting element and reflectors and the concentric quartz tube in which the filament passes.

A unit assembly A contains a battery of lamp units B, C and D used for curing UV curable coating on an optical fiber, as best shown in FIG. 1. Each lamp unit is releasably clamped to each other so that any number of such units may joined together, as may be required in a specific application, as for example, in a high speed drawing application. A radiation generator lamp 2 is arranged within reflectors 4 and 6 which concentrate the radiation 7 onto a filament 8 which has a UV curable coating 10 thereon, as best shown FIG. 4. The reflectors 4 and 6 form a complete elliptical cylindrical surface with longitudinally extending focal points located at the lamp 2 and the filament 8. The lamp 2 is a standard elongated electrodeless discharge lamp energized by microwaves, such one disclosed in U.S. Pat. Nos. 4,042,850 and 4,359,668, both issued to Ury. The radiation generating lamp 2 is designed to produce between about 3,000 and 6,000 watts of energy, which is concentrated on a relatively thin and longitudinal cure zone.

Figure 3:
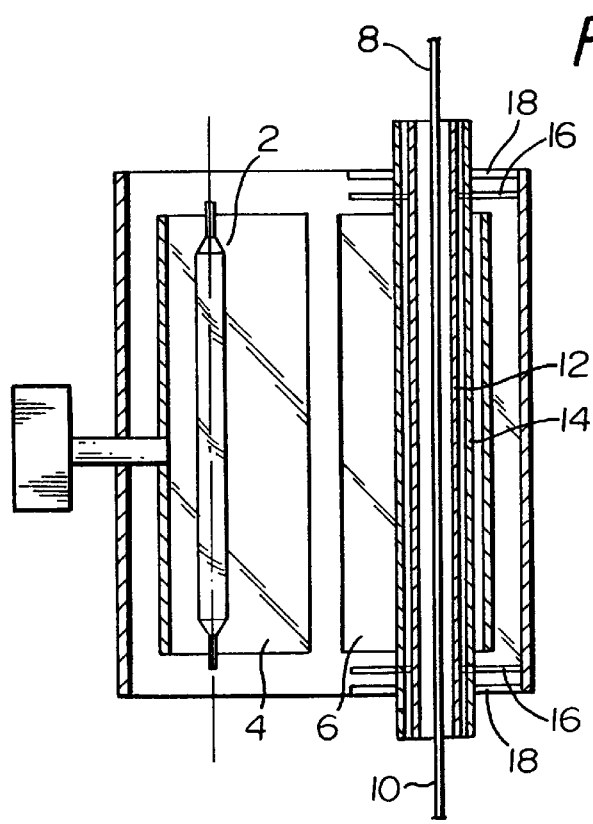
FIG. 3 is a fragmentary cross sectional view of the lamp apparatus and the tubular arrangements through which the filament passes.
Figure 4:
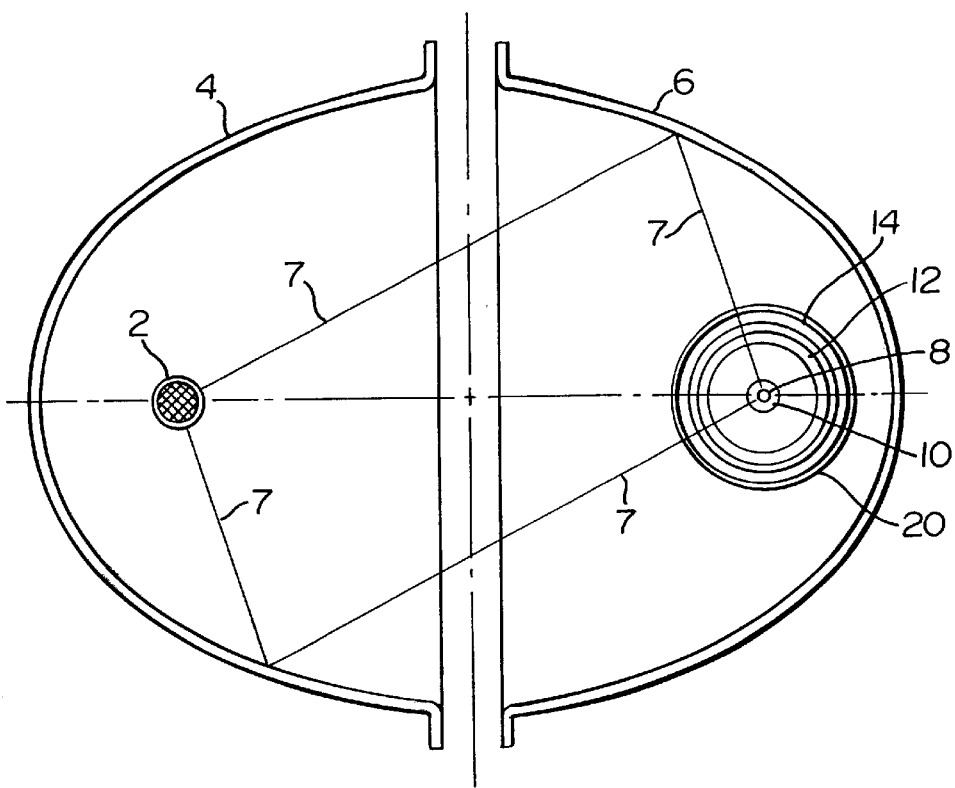
FIG. 4 is an enlarged view of the lamp reflector apparatus from an end view and showing the radiation reflecting from the reflector to the filament within the tubular members.

As best illustrated in FIGS. 3 and 4, a pair of concentric quartz tubes 12 and 14 surround the filament 8 which passes therethrough. Brackets 16 and 18 position the quartz tubes 12 and 14. Bracket 16 is designed to permit the quartz tube 12 to be readily removed for replacement. The innertube 12 is substantially as long as the outertube 16 such that the innertube 12 effective isolates the outertube 16 from the cure zone. During operation, the interior surface of the innertube 12, which is in the cure zone, becomes coated with the condensing gasses from the curing process, necessitating its replacement at least once or twice a day. The deposited byproducts cause the innertube 12 to grow darker over time, degrading its ability to transmit UV radiation. The innertube 12, which is a dispensable item, advantageously isolates the outertube 14, which is substantially more expensive, and protects it from getting coated by the byproducts of the curing process.

The innertube 12 isolates the filament 8 from the buffeting effect of the cooling air pumped into the lamp enclosure to cool the lamp 2.

The innertube tube 12 is about 21 mm I.D. and 23 mm O.D. The outertube 14 are about 25 mm I.D. and 28 mm O.D.

Quartz tube 14 is provided with a coating 20 on its outside surface, as best shown in FIG. 4. The coating 20 may be on the inside of the quartz tube 14, although it is shown on the outside. The coating 20, called a hot mirror finish, is a mirror reflector for IR light and is transparent to UV light, allowing it to pass through. The coating preferably has IR reflectivity from about 90% for wavelengths greater than 800 nm and UV transmitability of about 70% to about 80% of wavelengths less than about 400 nm. The coating is available from commercial sources, such as Optical Coating Laboratories, Inc., Newport Thin Film, and others.

The mirror coating on the tube 14 is dichroic mirror coating.

A person skilled in the art should understand that elimination of the clear innertube 12 will also provide the same benefit of reflecting the unwanted heat generating IR radiation away from the filament 8.

PROCESS

In the process of curing the UV curable coating 10 on the filament 8, the filament 8 is drawn through the radiating apparatus. During startup, when the filament 8 is stationary, the filament 8 is advantageously shielded by the outertube 14 from the IF heat generated by the lamp. As the filament moves through the innertube 12, the coating on the outertube 14 advantageously limits the amount of IF radiation that reaches the filament, while permitting transmission of the UV radiation for curing the coating on the filament. Nitrogen or other inert gas may be used inside the innertube 12 to displace oxygen during the curing process.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. Apparatus for curing UV curable coating on a filament, comprising:
   a) a UV radiation generating apparatus that also generates IR radiation;
   b) a first tube having an axis and front and rear openings for receiving and exiting a filament passing therethrough along said first tube axis;
   c) said first tube for passing UV light therethrough for curing the UV curable coating on the filament;
   d) said first tube including a coating to reflect the IR radiation and pass UV radiation;
   e) whereby said IR light reflecting coating will prevent overheating said UV curable coating on the filament.
2. Apparatus as in claim 1, and further comprising:
   a) a second tube disposed within said first tube; and
   b) said second tube is effective to pass the UV radiation.
3. Apparatus as in claim 2, wherein:
   a) said second tube is a quartz tube.
4. Apparatus as in claim 2, wherein:
   a) said first tube has an inner diameter of about 25 mm; and
   b) said second tube has an inner diameter of about 20 mm.
5. Apparatus as in claim 2, wherein:
   a) said second tube is readily replaceable.
6. Apparatus as in claim 1, wherein:
   a) said first tube coating is a mirror coating on said first tube.
7. Apparatus as in claim 6, wherein:
   a) said mirror coating in on an outside surface of said first tube.
8. Apparatus as in claim 6, wherein:
   a) said mirror coating is a hot mirror coating.
9. Apparatus as in claim 6, wherein:
   a) said mirror coating on said first tube is a dichroic mirror coating.
10. Apparatus as in claim 1, wherein:
    a) said first tube is a quartz tube.
11. Apparatus as in claim 1, wherein:
    a) said first tube has an IR reflectivity of about 90% of wavelengths greater than 800 nm and transmitability of about 70% to about 80% of wavelengths less than about 400 nm.
12. Apparatus for curing UV curable coating on a filament, comprising:
    a) a UV radiation generating apparatus that also generates IR radiation;
    b) a first tube having an axis and front and rear openings for receiving and exiting a filament passing therethrough along said first tube axis, said first tube enclosing a cure zone;
    c) a second tube disposed around said first tube;
    d) said first tube being transparent to UV radiation to thereby pass the UV radiation to cure the UV curable coating on the filament;
    e) said second tube including a coating on its outside surface, said coating being effective to reflect the IR radiation and transmit the UV radiation;
    f) whereby said coating will prevent overheating said UV curable coating on the filament.
13. Apparatus as in claim 12, wherein:
    a) said first tube is removable for replacement.
14. Apparatus as in claim 12, wherein:
    a) said first tube is configured to isolate said second tube from the cure zone.

* * * * *